(12) United States Patent
Kubota et al.

(10) Patent No.: US 7,847,490 B2
(45) Date of Patent: Dec. 7, 2010

(54) SELF-BALLASTED FLUORESCENT LAMP AND LIGHTING APPARATUS

(75) Inventors: Hiroshi Kubota, Yokosuka (JP); Shinya Hakuta, Yokohama (JP); Mari Nakamura, Odawara (JP); Ryota Irie, Yokosuka (JP); Katsuyuki Kobayashi, Yokohama (JP); Hitoshi Kawano, Yokohama (JP); Yoshikazu Ito, Nishiokitama-gun (JP); Yasuhiro Shida, Nishiokitama-gun (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 713 days.

(21) Appl. No.: 11/909,291

(22) PCT Filed: Mar. 24, 2006

(86) PCT No.: PCT/JP2006/305918

§ 371 (c)(1),
(2), (4) Date: Sep. 21, 2007

(87) PCT Pub. No.: WO2006/101189

PCT Pub. Date: Sep. 28, 2006

(65) Prior Publication Data

US 2009/0066254 A1  Mar. 12, 2009

(30) Foreign Application Priority Data

| Mar. 24, 2005 | (JP) | ............................. 2005-086784 |
| Mar. 24, 2005 | (JP) | ............................. 2005-087001 |
| Jul. 12, 2005 | (JP) | ............................. 2005-203478 |

(51) Int. Cl.
*G05F 1/00* (2006.01)
*H01J 5/48* (2006.01)

(52) U.S. Cl. .................. 315/307; 313/318.09

(58) Field of Classification Search ............... 315/291, 315/307, DIG. 2, DIG. 4, DIG. 5; 313/324, 313/318.09, 623, 624, 626, 627, 312, 317, 313/318.01, 318.02, 318.05, 318.06
See application file for complete search history.

(56) References Cited

U.S. PATENT DOCUMENTS

| 6,437,516 | B2 * | 8/2002 | Hakuta et al. ............... 315/244 |
| 6,577,066 | B1 * | 6/2003 | Kominami et al. ........... 315/58 |
| 6,727,661 | B2 * | 4/2004 | Kominami et al. ...... 315/209 R |
| 6,794,801 | B2 | 9/2004 | Yasuda et al. |
| 2003/0080691 | A1 | 5/2003 | Yasuda et al. |

FOREIGN PATENT DOCUMENTS

CN           1416152 A        5/2003

(Continued)

OTHER PUBLICATIONS

Chinese Second Notification of Office Action dated Feb. 27, 2009 during prosecution of corresponding Chinese Patent Application No. 200680001649.9.

*Primary Examiner*—Douglas W Owens
*Assistant Examiner*—Minh D A
(74) *Attorney, Agent, or Firm*—McDermott Will & Emery LLP

(57) ABSTRACT

A self-ballasted fluorescent lamp capable of achieving a similar appearance to that of an electric light bulb for general illumination includes a base that is attached to a bottom end of a cover and a luminous tube that is supported at a top end of the cover. Electronic components forming a lighting circuit are mounted on a substrate. The substrate is formed to have such a width dimension that allows the substrate to be inserted into the base. The substrate is vertically disposed along a center axis of the base at a position offset from the center axis. Large electronic components are disposed on a first face of the substrate, which faces a large component area in the base formed by the offset substrate.

10 Claims, 10 Drawing Sheets

FOREIGN PATENT DOCUMENTS

| | | |
|---|---|---|
| JP | 58-133212 U | 9/1983 |
| JP | 2-52484 U | 4/1990 |
| JP | 5-21175 A | 1/1993 |
| JP | 7-85708 A | 3/1995 |
| JP | 7-176202 A | 7/1995 |
| JP | 9-153341 A1 | 6/1997 |
| JP | 2003-297110 A | 10/2003 |
| JP | 2004-6204 A | 1/2004 |
| JP | 2004-055293 A | 2/2004 |
| JP | 2004-165053 A | 6/2004 |

\* cited by examiner

SELF-BALLASTED FLUORESCENT LAMP AND LIGHTING APPARATUS

CROSS-REFERENCE TO RELATED APPLICATIONS

This application is the national phase under 35 U.S.C. §371 of International Application No. PCT/JP2006/305918, filed Mar. 24, 2006, which claims the benefit of Japanese Patent Application Nos. 2005-086784 filed Mar. 24, 2005, 2005-087001 filed Mar. 24, 2005 and 2005-203478 filed Jul. 12, 2005, all of them are incorporated by reference herein. The International Application was published in Japanese on Sep. 28, 2006 as WO 2006/101189 A1 under PCT Article 21(2).

FIELD OF THE INVENTION

The present invention relates to a self-ballasted fluorescent lamp provided with luminous tube and a lighting device for lighting the luminous tube. The present invention further relates to a lighting apparatus provided with the self-ballasted fluorescent lamp.

BACKGROUND OF THE INVENTION

A conventional self-ballasted fluorescent lamp typically includes a luminous tube, a cover, a lighting device, and a globe. The luminous tube has bent bulbs. A base is fitted to one end of the cover, and the luminous tube is supported at the opposite end of the cover. The lighting device is disposed inside the cover. The globe is attached to the other end of the cover and encases the luminous tube.

There is a conventionally known example of a self-ballasted fluorescent lamp, as disclosed by Japanese Laid-Open Patent Publication No. 2004-55293, which is hereby incorporated by reference in its entirety herein. In this self-ballasted fluorescent lamp, the tip of a thin tube extruding from an end of a bulb of a luminous tube is extended into a base, and an amalgam for mercury vapor pressure control is sealed in the tip of the thin tube. This configuration is capable of maintaining a relatively low temperature at the tip of the thin tube even during lighting and enables an increase in mercury vapor pressure regardless of the temperature conditions when the lamp is not lit. As a result, luminous flux rising characteristics immediately after lighting is improved. This lighting device has a substrate disposed so as to extend in the direction intersecting the height of the lamp, and the distal end of large-size electronic components that protrude higher than do other electronic components mounted on the substrate are positioned, together with the thin tube, inside the base.

Although self-ballasted fluorescent lamps having such a configuration as described above are becoming more compact recently so that their lamp length and maximum outer diameter are similar to those of electric light bulbs for general illumination as defined by JIS Standard, the cover of those conventional self-ballasted fluorescent lamps for housing the lighting device has a considerably large maximum outer diameter or occupies a proportionally large part of the lamp length. Such a large cover not only makes it difficult to bring the appearance of the self-ballasted fluorescent lamp sufficiently close to that of an electric light bulb for general illumination but also blocks a large proportion of light distribution to the side where the base is provided. As a result, during the time the luminous tube is lit, light distribution characteristics are not sufficiently similar to those of an electric light bulb for general illumination.

There is another conventionally known example of a self-ballasted fluorescent lamp, as disclosed by Japanese Laid-Open Patent Publication No. 2004-165053, which is hereby incorporated by reference in its entirety herein. In this self-ballasted fluorescent lamp, a substrate of a lighting device housed in a cover is positioned vertically along the height direction of the lamp; a narrow portion that enables insertion of the substrate along the center axis of the base is formed at the base-facing end of the substrate; and the narrow portion and a part of the electronic component mounted on the narrow portion are disposed inside the base.

As described above, although the appearance of conventional self-ballasted fluorescent lamps is becoming increasingly similar to that of an electric light bulb for general illumination, their dimensions are not sufficiently similar to enable replacement of an electric light bulb for general illumination without causing any negative aspects.

It is possible to make the cover compact by positioning the substrate vertically so as to enable the narrow portion of the substrate and a part of an electronic component to be placed inside the base, thereby reducing the size of the portion of the substrate that is located in the cover but outside the base. However, as the narrow portion of the substrate is positioned along the center axis of the base, the maximum distance between each of the two faces of the substrate on which electronic components are mounted and the part of the inner wall of the base facing the substrate face is ½ of the maximum width of the space inside the base (in cases where the cylindrical portion of the cover protrudes into the base, the maximum width of the internal space of the cylindrical portion), and the height of each electronic component to be mounted is limited within such a range as to permit positioning in such a space. Therefore, electronic components, such as a choke coil, that protrude a substantial distance from the substrate and cannot be positioned in the base have to be provided outside the base. Furthermore, an electronic component having a greater height, such as a smoothing capacitor, has to be mounted with its lead wires at an approximately right angle so that they extend along the substrate in order to reduce the height of the electronic component, i.e. the distance by which the electronic component protrudes from the substrate. However, doing so increases the area on the substrate occupied by the electronic component, resulting in the need for a larger substrate.

In short, merely positioning the substrate vertically and providing a narrow portion of the substrate and a part of an electronic component in the base does not enable efficient positioning of the lighting device in the base or the cover to be made sufficiently compact. Furthermore, it is difficult to give the lamp an appearance sufficiently similar to that of an electric light bulb for general illumination.

A self-ballasted fluorescent lamp with a thin tube positioned inside the base as offered in Japanese Laid-Open Patent Publication No. 2004-55293 does not enable a component to be positioned in the space inside the base with sufficiently high efficiency, because the thin tube is positioned close to the distal end of a large-size electronic component. As the electronic components must be mounted on the substrate in such a manner as not to come into contact with thin tube, this configuration presents limitations in how much the component placement efficiency can be increased. It is difficult to make the cover compact, because the substrate, which is positioned between the base and the luminous tube, is inevitably larger than the base.

SUMMARY OF THE INVENTION

In order to solve the above problems, an object of the present invention is to provide a self-ballasted fluorescent lamp capable of efficiently housing a lighting device in a base, thereby reducing the size of a cover and achieving a similar appearance to that of an electric light bulb for general illumination. Another object of the invention is to provide a lighting apparatus having such a self-ballasted fluorescent lamp.

A self-ballasted fluorescent lamp according to the present invention has a bottom end and a top end that are respectively located at two lengthwise ends of the self-ballasted fluorescent lamp. The self-ballasted fluorescent lamp includes a luminous tube; a cover having a bottom end, to which a base is attached, and a top end, at which the luminous tube is supported; and a lighting device provided with a substrate having a first face and a second face on both of which electronic components constituting a lighting circuit for lighting the luminous tube are mounted. The substrate has such a width dimension that enables insertion of the substrate into the base and is positioned vertically along the center axis of the base, offset from the center axis of the base. A spacious area is provided between the first face of the substrate and the part of the inner wall of the base that faces the first face, and a narrower area that is narrower than the spacious area is provided between the second face of the substrate and the part of the inner wall of the base that faces the second face. Large-size electronic components among the aforementioned electronic components are mounted on the first face, which faces the spacious area. With the configuration as above, the lighting device can be efficiently positioned in the base. Therefore, this configuration enables the cover to be made compact and achieves an appearance similar to that of an electric light bulb for general illumination.

Examples of the luminous tube include but are not limited to a bent-type luminous tube principally comprised of a plurality of U-shaped bulbs that are arranged one in front of the other so as to form a single discharge path, and a luminous tube formed by bending a single bulb into the shape of a spiral. Although an electrode is typically sealed in each end of the discharge path, the luminous tube may be of an electrodeless type, wherein the interior of the luminous tube is not provided with a pair of electrodes.

Although a threaded-type base that is widely referred to as an E-type base is usually used, the base is not limited to this type. Any base that can be attached to a socket for an electric light bulb for general illumination may be used.

The cover serves to directly or indirectly support the luminous tube. In cases where the cover serves to indirectly supports the luminous tube, it is desirable that a holder to which the luminous tube can be attached be provided at the top end of the cover. A globe for encasing the luminous tube may be attached to the cover.

The lighting circuit of the lighting device is comprised of an inverter circuit or the like that is primarily comprised of electronic components for lighting the luminous tube by applying a high frequency power, which may be of more than 10 kHz, to the luminous tube.

The substrate is formed in an approximately rectangular shape with such a width dimension that allows the substrate to be inserted in a vertical position into the base. The offset distance of the substrate from the center axis of the base may be appropriately set with respect to the mounting area of the substrate or the height of the electronic components mounted on the substrate.

Examples of the electronic components mounted on the first face, which faces the spacious area in the base, include a choke coil and a smoothing capacitor. Electronic components, such as transistors low in height, chip-shaped capacitors, and a rectifying device, may be mounted on the second face, which is the reverse side of the first face, of the substrate. It is desirable that the electronic components mounted on the second face be a surface mounting type. An electronic component of a surface mounting type means an electronic component whose lead wires are drawn from the body of the electronic component so as to extend approximately in parallel with the mounting surface of the substrate.

A self-ballasted fluorescent lamp according to the present invention may have a luminous tube that is provided with a thin tube projecting from a bottom end of the luminous tube; an amalgam is sealed in a tip of the thin tube; and the tip of the thin tube is positioned in the narrower area, which is located between the second face of the substrate and the inner wall of the base. In addition to reducing the thermal influence that the luminous tube exerts on the amalgam during the time the luminous tube is lit, this configuration improves the mounting efficiency by enabling electronic components with a significant protruding distance from the substrate to be mounted on the first face of the substrate, at which the thin tube is not provided. As the lighting device and the thin tube can thus be efficiently disposed in the base, the cover can be made compact so that the self-ballasted fluorescent lamp has an appearance similar to that of an electric light bulb for general illumination.

The thin tube extends from and is attached to an end of a bulb by sealing. The thin tube may also be used as an exhaust tube.

In order to improve luminous flux rising characteristics, it is desirable that the amalgam have such characteristics that mercury vapor pressure immediately after lighting is similar to that of pure mercury and that mercury vapor pressure during a stable lighting period can be controlled at an appropriate level. The amalgam may be formed of an alloy comprised of, for example, Bi—Sn—Hg. However, the composition of the amalgam is not limited, provided that desired characteristics of mercury vapor pressure are ensured. When the amalgam is sealed, it is desirable to dispose an auxiliary amalgam in a bulb. The auxiliary amalgam, however, is not essential. As long as the luminous tube is designed so as to ensure that appropriate dissipation of mercury vapor occurs inside the luminous tube immediately after lighting, it is sufficient to seal only an amalgam in the luminous tube.

A self-ballasted fluorescent lamp according to the present invention may dispose the substrate, which is offset from the center axis of the base, at such a location that the relationship of A and B is limited in the range of $0.5<A/B\leqq0.8$, with A representing the distance between the inner wall of the base and the first face of the substrate, which faces the spacious area, and B representing the inner diameter of the base.

A ratio A/B that is not greater than 0.5 would make placement of a large-size electronic component difficult. A ratio A/B greater than 0.8 is also undesirable, because it would require a substantially narrower substrate, resulting in a smaller mounting area and a reduced mounting efficiency of the electronic components on the substrate. In cases where a substrate with electronic components mounted thereon is positioned in an E26-type base, a ratio A/B in the range of 0.6 to 0.75 is more desirable, taking into consideration such factors as the height of the electronic components and the mounting efficiency.

In cases where the space inside the base is in a cylindrical shape, it is desirable that the offset distance of the substrate from the center axis of the base be limited so that the distance of the substrate from the inner wall of the base does not exceed three quarters of the inner diameter of the base. It is not desirable to position the substrate closer to the inner wall of the base in such a way that the distance of the substrate from the inner wall of the base exceeds three quarters of the inner diameter of the base, because positioning the substrate outside the abovementioned range makes the width of the substrate exceedingly narrower, resulting in a smaller mounting area and a reduced mounting efficiency of the electronic components on the substrate.

A self-ballasted fluorescent lamp according to the present invention may include an electronic component that is mounted close to a widthwise edge of the substrate and positioned at an angle towards the middle of the width of the substrate. This configuration enables insertion of the substrate into the base without the abovementioned electronic component coming into contact with the inner wall of the base, ensuring efficient positioning of the lighting device in the base.

The electronic component mounted in an angled position may be a discrete component, in other words what is widely called a radial component and is mounted in an upright position on the substrate by means of two lead wires.

A self-ballasted fluorescent lamp according to the present invention may include a smoothing capacitor among the electronic components mounted on the substrate on the first face of the substrate, at a location in the middle of the width of the substrate, so as to protrude perpendicularly from the first face of the substrate. This configuration improves mounting efficiency of the substrate and enables the reduction of the dimensions of the substrate.

A self-ballasted fluorescent lamp according to the present invention may include an input power circuit connected to the base, an inverter circuit connected to the input power circuit, and an output unit of the inverter circuit connected to the luminous tube are formed on the substrate in a sequential arrangement from the bottom end of the substrate, at which the tip of the base is located, to the top end, at which the luminous tube is located. With the configuration as above, a circuit pattern in which components are arranged in an appropriate order in one direction from the input side to the output side is formed on the substrate, eliminating the necessity of the routing of the circuit pattern and enabling the reduction of the dimensions of the substrate.

A self-ballasted fluorescent lamp according to the present invention may include an indented portion for preventing interference with an electronic component that is formed in the inner surface of the cover.

The indented portion is formed so as to prevent interference with, for example, corners of a large-size electronic component, such as a choke coil or an electrolytic capacitor. The indented portion may serve to accommodate an electronic component when the self-ballasted fluorescent lamp is in the assembled state, or permit the corresponding electronic component to pass through at the time of assembly but does not accommodate it when the self-ballasted fluorescent lamp is in the assembled state.

A self-ballasted fluorescent lamp according to the present invention may include a substrate that is provided with a pair of protruding portions in such a manner that each protruding portion protrudes from each respective widthwise edge of the substrate in the direction in which a mounting surface of the substrate extends, away from an electronic component disposed near the edge of the substrate. By using the pair of protruding portions, the substrate can be supported by the cover. Furthermore, when a plurality of substrates are cut out from a single aggregate substrate, the presence of the protruding portions protects the electronic components disposed close to the edges of each substrate from a mechanical load.

A self-ballasted fluorescent lamp according to the present invention may include a thermal conductive material that serves to thermally connect the base with at least one or more electronic components among the aforementioned electronic components that are disposed in the base. This enables effective dissipation of heat generated by the electronic components.

A material with superior thermal conductivity and electric insulation property, such as a silicon resin or an epoxy resin, is used as the thermal conductive material.

A lighting apparatus according to the present invention may further include a lighting apparatus body; a socket attached to the lighting apparatus body; and a self-ballasted fluorescent lamp attached to the socket.

BRIEF DESCRIPTION OF THE DRAWINGS

The invention will become more readily apparent from the Detailed Description of the Invention, which proceeds with reference to the drawings, in which.

Figure 1:
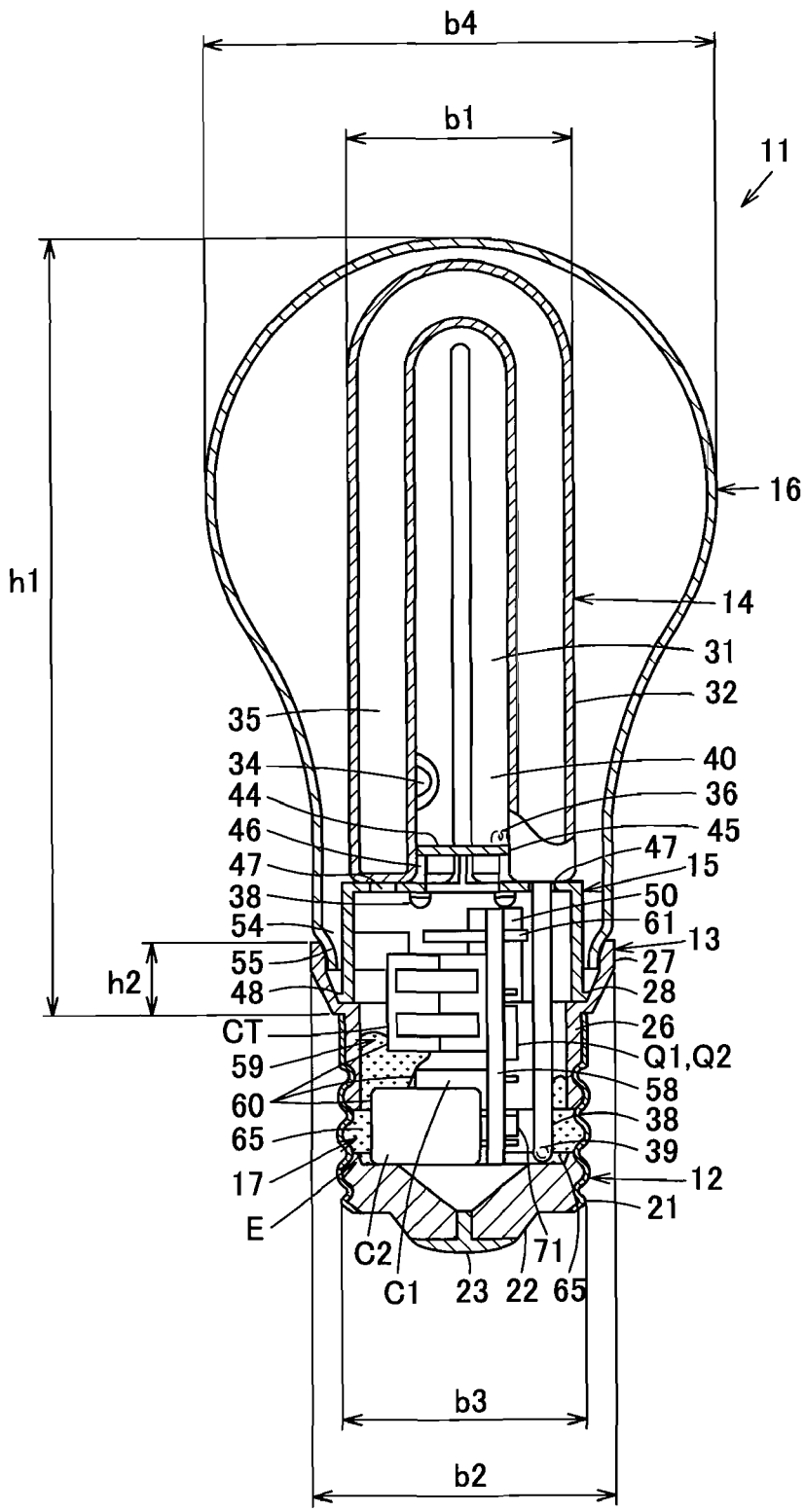
FIG. 1 is a sectional view of a self-ballasted fluorescent lamp according to a first embodiment of the present invention as viewed in the direction in which bulbs of the lamp are aligned.

In the figures, elements that are repeatedly illustrated are consistently identified by a single reference number.

DETAILED DESCRIPTION OF THE INVENTION

The following table provides a key to the reference numerals and elements depicted in the drawings.
- 11 self-ballasted fluorescent lamp
- 12 base
- 13 cover
- 14 luminous tube
- 17 lighting device
- 38 thin tube
- 39 main amalgam as amalgam
- 58 substrate
- 59 lighting circuit
- 60 electronic component
- 65 thermo-conductive material
- 72 inverter circuit
- 81 lighting apparatus
- 82 lighting apparatus body
- 83 socket
- 91 indented portion
- 97 protruding portion
- C2 electrolytic capacitor as smoothing capacitor
- E input power supply circuit Features of self-ballasted fluorescent lamp according to the present invention can be characterized as follows.

The substrate of a self-ballasted fluorescent lamp according to the present invention has a width dimension that enables insertion of the substrate into the base and is positioned vertically along the center axis of the base, offset from the center axis of the base, thereby allowing large-size electronic components among the electronic components to be mounted on the first face, which faces the spacious area in the base. With the configuration as above, the lighting device can be efficiently positioned in the base. Therefore, this configuration enables the cover to be made compact and achieves an appearance similar to that of an electric light bulb for general illumination.

According to the present invention, the tip of the thin tube in which the amalgam is sealed may be positioned in the narrower area, which is located between the second face of the substrate and the inner wall of the base. Therefore, the self-ballasted fluorescent lamp is capable of reducing the thermal influence that the luminous tube exerts on the amalgam during the time the luminous tube is lit, and also capable of improving the mounting efficiency by enabling electronic components with a significant protruding distance from the substrate to be mounted on the first face of the substrate, at which the thin tube is not provided. As a result, the lighting device and the thin tube can be efficiently disposed in the base, and the cover can be made compact so that the self-ballasted fluorescent lamp has an appearance similar to that of an electric light bulb for general illumination.

The substrate of a self-ballasted fluorescent lamp according to the present invention may be offset from the center axis of the base, at such a location that the relationship of A and B is limited in the range of $0.5 < A/B \leq 0.8$, wherein A represents the distance between the inner wall of the base and the first face of the substrate, which faces the spacious area, and B represents the inner diameter of the base. Therefore, while having the same effects as those of a self-ballasted fluorescent lamp as claimed in claim 1 and claim 2, a self-ballasted fluorescent lamp according to the present invention as claimed in claim 3 enables mounting of large-size electronic components and at the same time ensures a sufficient mounting area for the electronic components by ensuring a sufficient width of the substrate.

An electronic component that is mounted near the base, in other words close to a widthwise edge of the substrate, may be positioned at an angle towards the middle of the width of the substrate. This enables insertion of the substrate into the base without the abovementioned electronic component coming into contact with the inner wall of the base, ensuring efficient positioning of the lighting device in the base.

A smoothing capacitor, which is relatively tall in height among the electronic components mounted on the substrate, may be mounted on the first face of the substrate, at a location in the middle of the width of the substrate, so as to protrude perpendicularly from the first face of the substrate. This improves mounting efficiency of the substrate and enables the reduction of the dimensions of the substrate.

An input power circuit, an inverter circuit, and an output unit of the inverter circuit may be formed on the substrate in a sequential arrangement from the bottom end of the substrate, at which the bottom of the base is located, to the top end, at which the luminous tube is located. Thus, a circuit pattern in which components are arranged in an appropriate order in one direction from the input side to the output side is formed on the substrate. This facilitates the routing of the circuit pattern and thereby enables the reduction of the dimensions of the substrate.

An indented portion formed in the inner surface of the cover may be used to prevent interference with an electronic component disposed on the substrate. This facilitates assembly by making it less likely for the cover and the electronic component to come into contact with each other, when self-ballasted fluorescent lamp is assembled. Furthermore, the substrate may have a wider width to have a larger mounting area for the electronic components, thereby increasing the mounting efficiency. This can be achieved by positioning the substrate closer to the center axis of the base by the distance equivalent to the extent of interference with an electronic component that would otherwise occur.

The substrate may be provided with protruding portions in such a manner that each protruding portion protrudes from each respective widthwise edge of the substrate in the direction in which a mounting surface of the substrate extends, away from an electronic component disposed near the edge of the substrate. By using the pair of protruding portions, the substrate can be supported by the cover. A self-ballasted fluorescent lamp having this feature does not require an extra supporting mechanism. Furthermore, when a plurality of substrates are cut out from a single aggregate substrate, the presence of the protruding portions protects the electronic components disposed close to the edges of each substrate from a load, and thereby enables the substrate to be made more compact.

One or more electronic components among the electronic components disposed in the base may be thermally connected to the base by means of the thermal conductive material. This enables effective dissipation of heat generated by the electronic components.

Next, an embodiment of the present invention is explained hereunder, referring to attached drawings.

Figure 2:
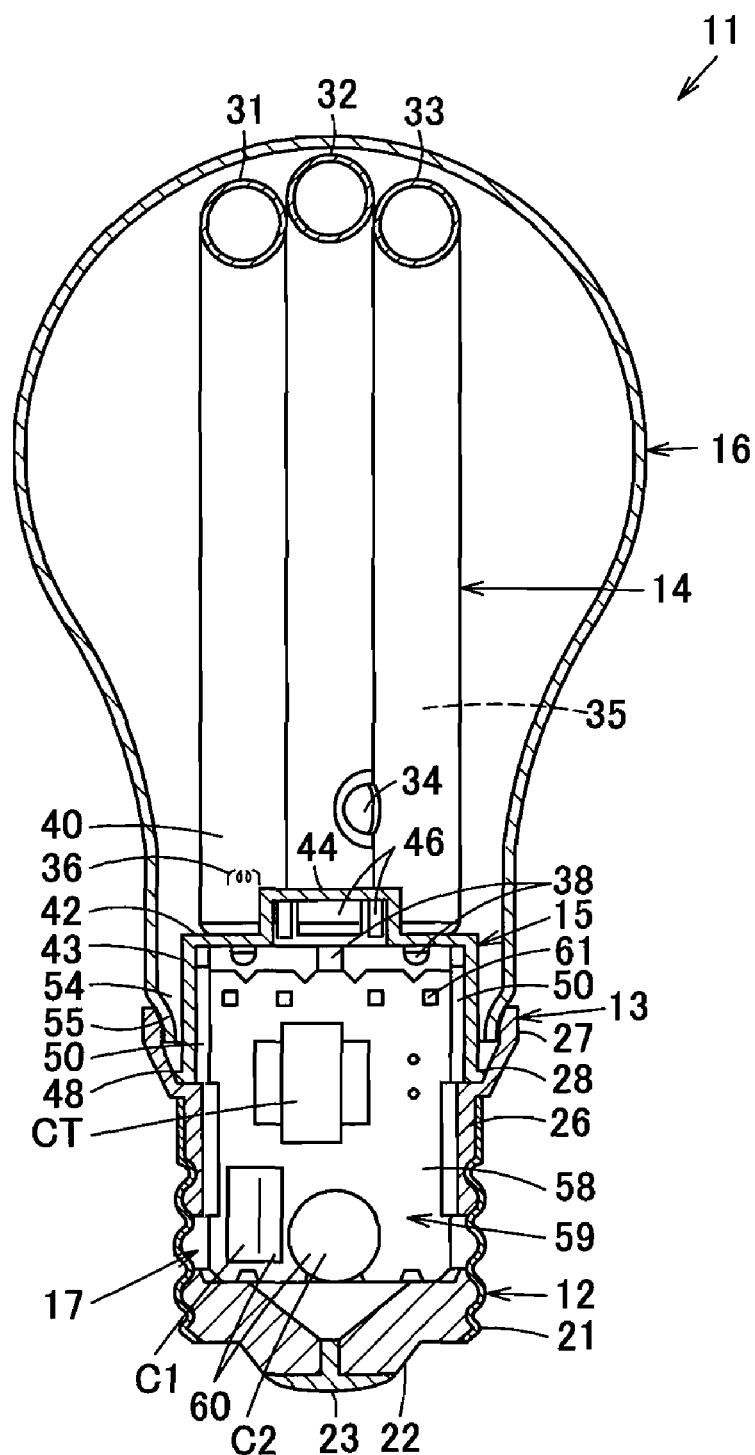
FIG. 2 is a sectional view of the aforementioned self-ballasted fluorescent lamp as viewed in a direction intersecting the direction in which the bulbs are aligned.
Figure 3:
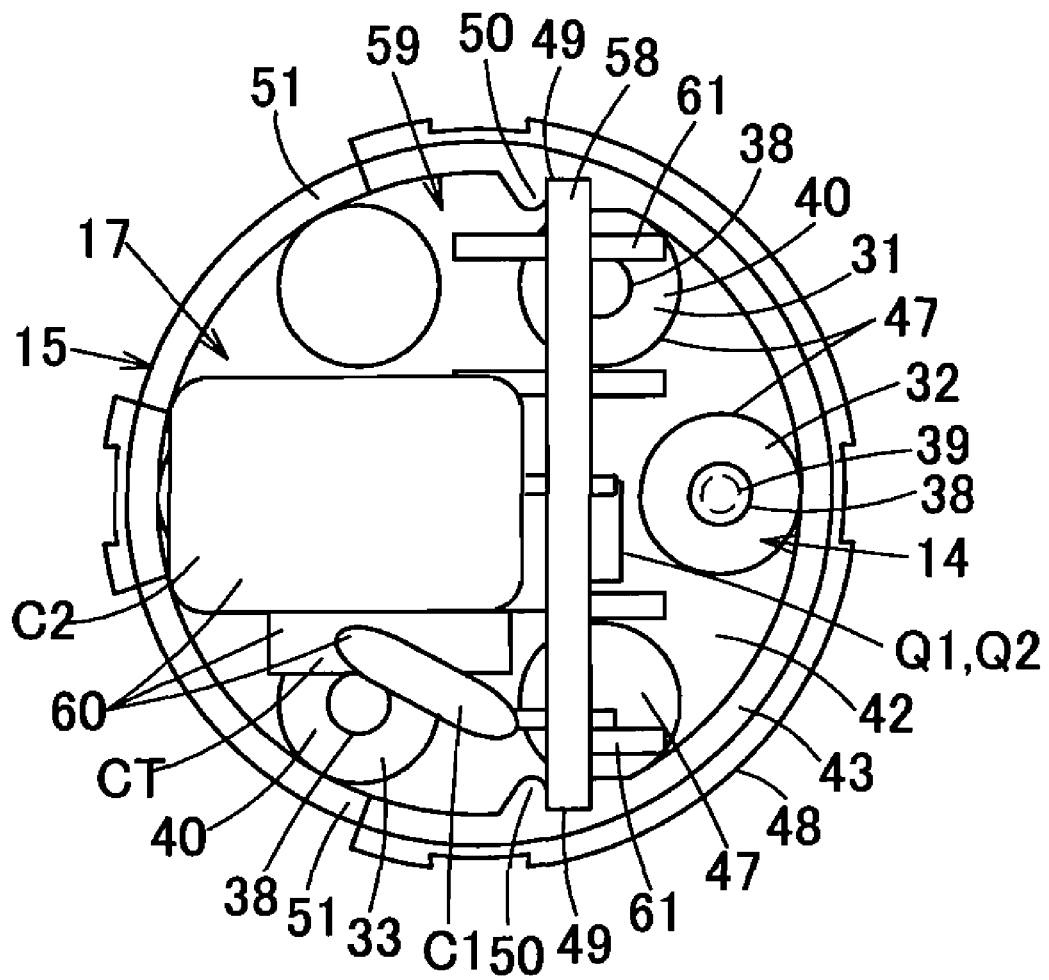
FIG. 3 is a bottom view of the self-ballasted fluorescent lamp, with a cover and a globe removed, as viewed from a bottom end of a holder.
Figure 4:
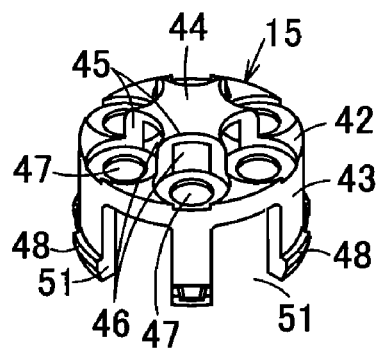
FIG. 4 is a perspective view of the holder of the self-ballasted fluorescent lamp.
Figure 5:
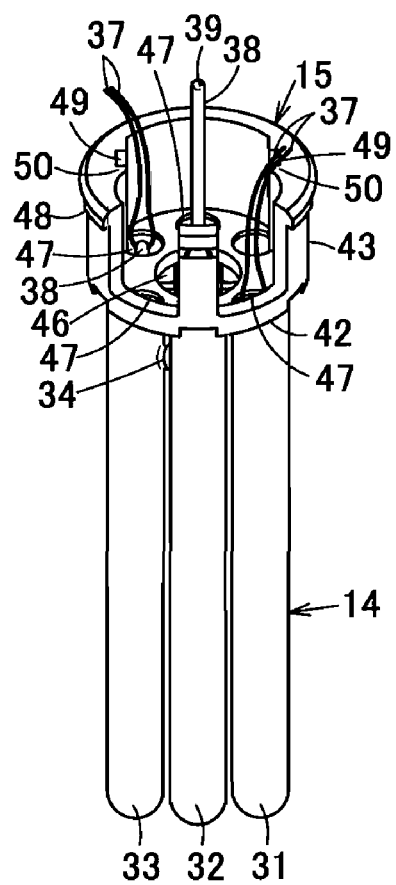
FIG. 5 is a perspective view of the holder, a luminous tube, and a substrate of the self-ballasted fluorescent lamp in an assembled state.
Figure 6:
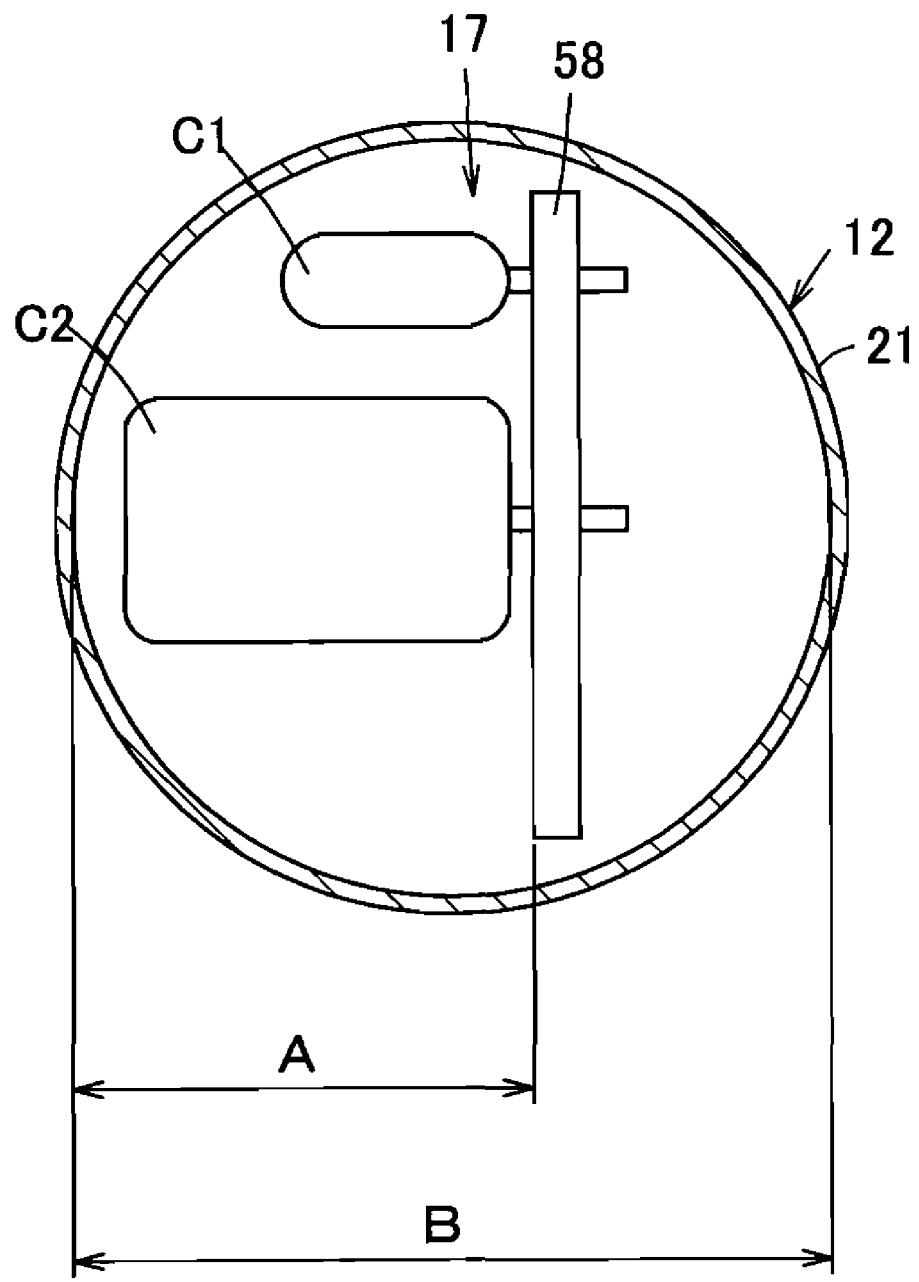
FIG. 6 is a sectional view of the self-ballasted fluorescent lamp showing the positional relationship of the substrate and a base.
Figure 7:
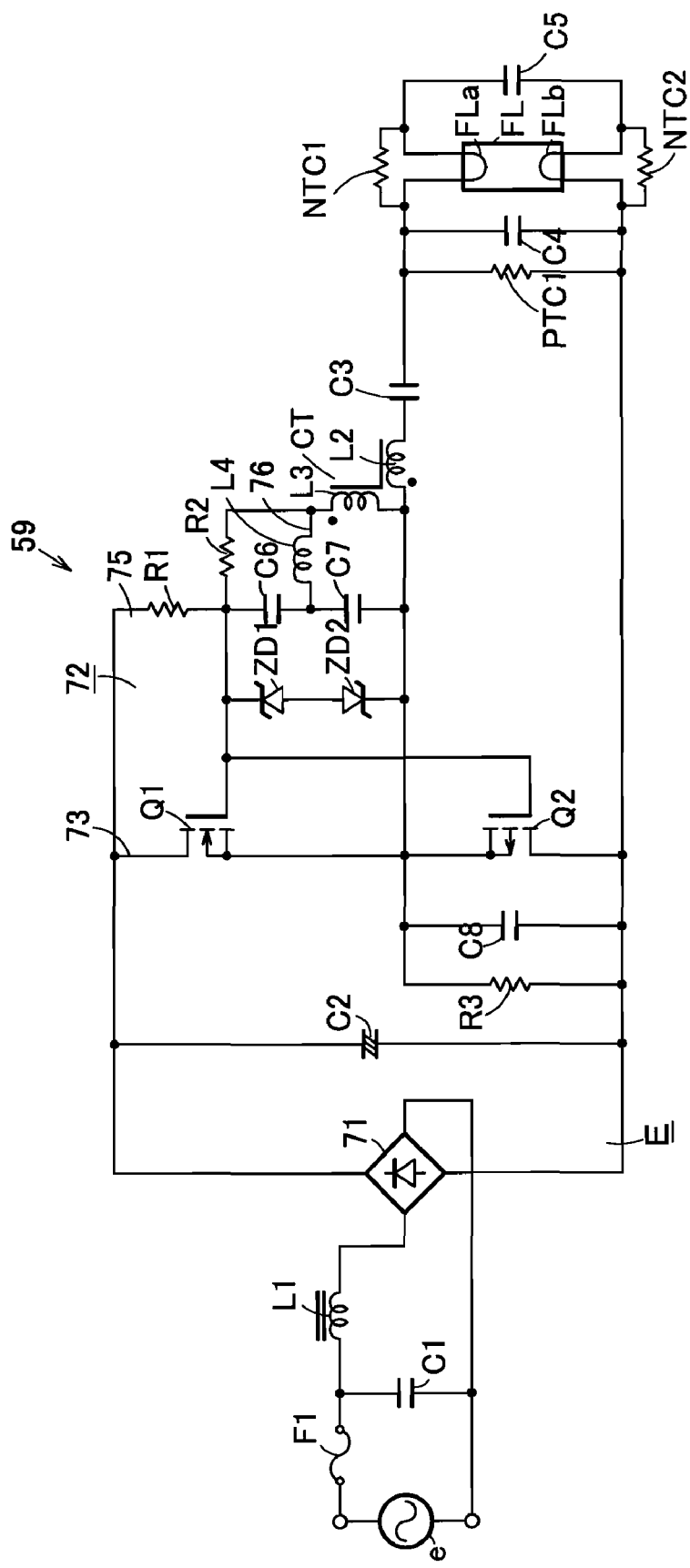
FIG. 7 is a circuit diagram of a lighting device of the self-ballasted fluorescent lamp.
Figure 8:
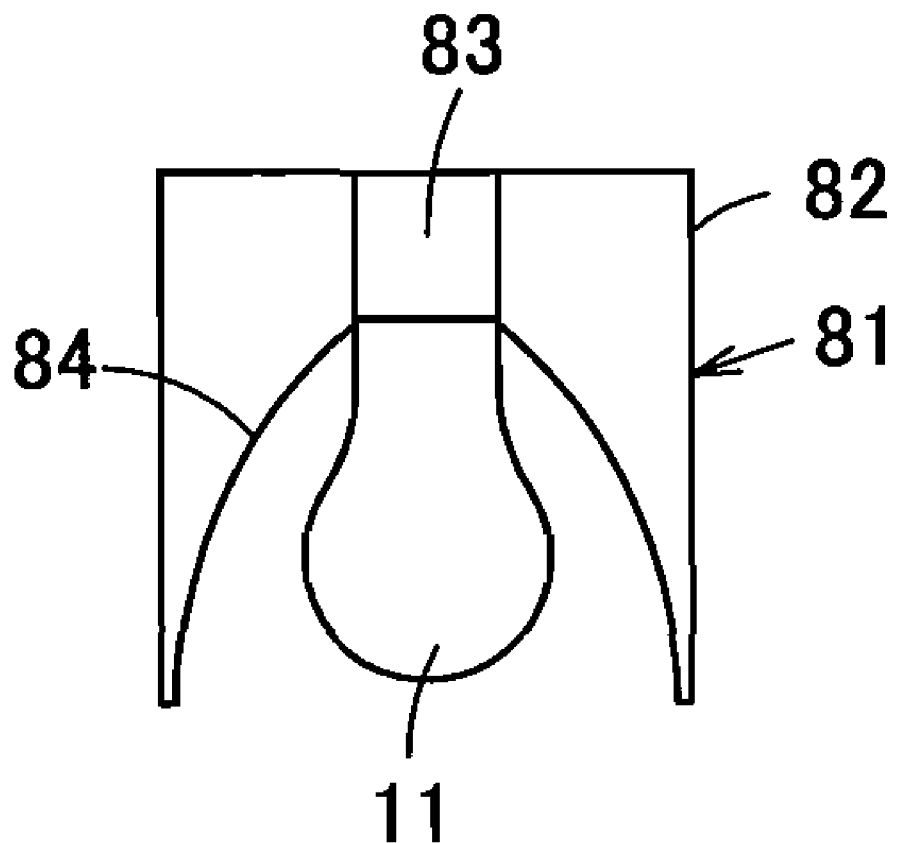
FIG. 8 is a schematic illustration of a lighting apparatus provided with the self-ballasted fluorescent lamp.

A first embodiment of the present invention is shown in FIGS. 1 through 8. FIG. 1 is a sectional view of a self-ballasted fluorescent lamp as viewed in the direction in which bulbs of the lamp are aligned; FIG. 2 is a sectional view of the aforementioned self-ballasted fluorescent lamp as viewed in a direction intersecting the direction in which the bulbs are aligned; FIG. 3 is a bottom view of the self-ballasted fluorescent lamp, with a cover and a globe removed, as viewed from an end of a holder; FIG. 4 is a perspective view of the holder of the self-ballasted fluorescent lamp; FIG. 5 is a perspective view of the holder, a luminous tube, and a substrate of the self-ballasted fluorescent lamp in an assembled state; FIG. 6 is a sectional view of the self-ballasted fluorescent lamp showing the positional relationship of the substrate and a base; FIG. 7 is a circuit diagram of a lighting device of the self-ballasted fluorescent lamp; and FIG. 8 is a schematic illustration of a lighting apparatus provided with the self-ballasted fluorescent lamp.

Referring to FIGS. 1 and 2, numeral 11 denotes a self-ballasted fluorescent lamp. The self-ballasted fluorescent lamp 11 is provided with a cover 13; a base 12 disposed at one end in the height direction of the cover 13; a luminous tube 14 supported at the other end of the cover 13; a holder 15; a globe 16 attached to the cover 13 in such a manner as to encase the luminous tube 14; and a lighting device 17 housed in the base 12 and the cover 13. In the explanation hereunder, the lengthwise end of the self-ballasted fluorescent lamp at which the base 12 is provided is referred to as the bottom, and the other lengthwise end of the self-ballasted fluorescent lamp is referred to as the top so that, of any component described herein, the end that faces towards the bottom of the lamp is referred to as the bottom end and that the opposite end is referred to as the top end, or, simply the other end. The holder 15 is attached to the cover 13 in such a manner as to support the bottom end of the luminous tube 14. The self-ballasted fluorescent lamp 11 has such an outer shape as to have nearly the same dimensions as standard dimensions of an electric light bulb for general illumination, e.g. a 40 W-, 60 W-, or 100 W-type incandescent lamp. The term "an electric light bulb for general illumination" mentioned above means a light bulb as defined by JIS Standard C 7501.

The base 12 may be of the E26 Edison type, and is mainly comprised of a threaded cylindrical shell 21, an insulating portion 22, and an eyelet 23. The eyelet 23 is provided at the tip of the bottom end of the shell 21, with the insulating portion 22 therebetween. The other end of the shell 21 is placed over the bottom end of the cover 13 and fastened thereto with a bonding agent, or by such other means as crimping.

The cover 13 is formed of a heat resistant synthetic resin, such as polybutylene terephthalate (PBT). A cylindrical base fitting portion 26 for receiving the shell 21 of the base 12 is formed at the portion close to the bottom end of the cover 13, and a flared, annular cover portion 27 is formed at the other end of the cover 13. A holder fitting portion 28 for receiving the holder 15 is formed on the inner surface of the cover 13.

The luminous tube 14 has bulbs 31,32,33, which consist of at least three U-shaped bent bulbs. These bulbs 31,32,33 are sequentially connected through communicating tubes 34 so as to form a single, continuous discharge path 35 with a length ranging from 250 to 500 mm. The communicating tubes 34 are formed by joining apertures of the bulbs 31,32,33 to one another, the aforementioned apertures being formed by heating and melting, and subsequently breaking through the appropriate portions near the ends of the bulbs 31,32,33 by blowing air through the bulb walls.

Each bulb 31,32,33 is formed into a U-like shape having a crown by bending at the middle portion a cylindrical glass bulb having an outer diameter ranging from 3 to 8 mm so that each bulb 31,32,33 has a curved bent portion and a pair of straight portions extending parallel to each other and integrally connected to the bent portion. The bulbs 31,32,33 are arranged such that the U-shaped bent bulb 32 in the middle is higher than the U-shaped bent bulbs 31,33, which flank the U-shaped bent bulb 32 and that the three U-shaped faces are positioned one in front of the other, in parallel with one another.

A phosphor, which may be three band phosphor, is formed on the inner surface of the luminous tube 14, and filler gas primarily containing a rare gas, such as argon (Ar), neon (Ne), or krypton (Kr), as well as mercury, is filled in the luminous tube 14.

An electrode 36 is disposed in the terminal end of each end bulb 31,33, i.e. the end located at each respective end of the discharge path 35, and sealed in the bulb 31,33 by means of stem sealing or pinch sealing. Each electrode 36 has a filament coil supported by a pair of weld wires. A pair of wires 37 (see FIG. 5) is drawn out of the terminal end of each respective end bulb 31,33 and connected to the lighting device 17. Each weld wire is connected to each respective wire 37 through a dumet wire sealed in the aforementioned end of each respective end bulb 31,33.

A cylindrical thin tube 38, which may otherwise be called an exhaust tube, projects from the terminal end of each respective end bulb 31,33, in which the electrodes 36 are disposed, as well as from both ends of the middle bulb 32. Each thin tube 38 is attached to the corresponding bulb 31,32, 33 by means of stem sealing or pinch sealing so that the interior of the thin tubes 38 and the bulbs 31,32,33 communicate with one another. In the production process of the luminous tube 14, the thin tubes 38 are sequentially sealed by fusing. The air in the luminous tube 14 is removed through one or more thin tubes 38 not yet sealed, and filler gas is injected into the luminous tube 14. After the filler gas has replaced the air, the unsealed part of the thin tubes 38 is sealed by fusing.

One of the thin tubes 38 respectively provided at the two ends of the middle bulb 32 is longer than the other thin tube 38 and extends straight, in parallel with the straight portions of the bulb 32 so that the tip of the thin tube 38 is located inside the base 12. A main amalgam 39, which serves as an amalgam, is disposed in the tip of the longer thin tube 38 when the thin tube 38 is sealed. The main amalgam 39 is formed of an alloy comprised of bismuth, tin, and mercury in a nearly spherical shape and serves to control the pressure of the mercury vapor in the luminous tube 14 within an appropriate range. The main amalgam 39 may be formed of an alloy containing indium, lead, or other appropriate metal instead of bismuth or tin. An auxiliary amalgam having a function of absorbing and releasing mercury is attached to the weld wires of the electrode of each end bulb 31,33 and sealed in the bulb. Furthermore, an auxiliary amalgam similar to those disposed in the end bulbs 31,33 is sealed in the end of the middle bulb 32 that is not provided with the longer thin tube 38.

The two end portions of the bulbs 31,32,33 of the luminous tube 14 in which the two electrodes 36 are respectively sealed are referred to as electrode-side end portions 40. The electrode-side end portions 40 are located at one end in the height direction of the luminous tube 14, i.e. the bottom end of the luminous tube 14. The outer diameter of each bulb 31,32,33 ranges from 3 to 8 mm, and the maximum width b1 of the luminous tube 14, i.e. the maximum dimension in a direction intersecting the height, is limited to not greater than 30 mm.

As shown in FIGS. 1 through 5, the holder 15 is formed of a heat resistant synthetic resin, such as polybutylene terephthalate (PBT), and has a disk-shaped base plate portion 42, and a cylindrical portion 43 projecting towards the bottom end of the self-ballasted fluorescent lamp 11 from the outer rim of the base plate portion 42.

A protruding portion 44, which can be inserted in the space surrounded by the bulbs 31,32,33 of the luminous tube 14, is formed at the center of the base plate portion 42. Arc-shaped concave portions 45 serving as a bulb fitting portion are formed in the cylindrical outer surface of the protruding portion 44 so that, of the end portion of each bulb 31,32,33, the inward-facing side, which faces towards the center of the luminous tube 14, can be fitted in each respective concave portions 45. A fitting hole 46 communicating with the space inside the holder 15 is formed in each concave portions 45.

Insertion holes 47 respectively facing the end faces of the bulbs 31,32,33 are formed in the base plate portion 42 so that the wires 37 and the thin tubes 38 projecting from the ends of the bulbs 31,32,33 can be inserted through the insertion holes 47. The diameter of the insertion holes 47 is smaller than the diameter of the bulbs 31,32,33 so as to prevent insertion of the ends of the bulbs 31,32,33.

After the luminous tube 14 is fitted to the holder 15, a bonding agent, such as a silicon resin or an epoxy resin, is injected from the inside of the holder 15 through the fitting holes 46 and the insertion holes 47 so that the end face of each bulb 31,32,33, as well as the inward-facing side of the end portion of each bulb 31,32,33, i.e. the side that faces towards the center of the luminous tube 14, is securely bonded to the holder 15.

Ridged portions 48 to be fitted to the holder fitting portion 28 of the cover 13 are formed near the bottom end of the cylindrical portion 43. A pair of substrate attaching portions 50 are formed on the inner surface of the cylindrical portion 43. Each substrate attaching portion 50 has a substrate attaching groove 49, which extends in parallel with the center axis of the holder 15 and is open at the bottom end of the cylindrical portion 43. The substrate attaching grooves 49 are located off the center axis of the holder 15 and face towards each other. The cylindrical portion 43 is also provided with a pair of cutout portions 51, which are formed at the side opposite where the pair of substrate attaching portions 50 is formed off the center axis of the holder 15.

The globe 16 is formed of a transparent or light-diffusing material, such as glass or synthetic resin, into a smoothly curved shape nearly identical to the glass bulb of an electric light bulb for general illumination, such as an incandescent lamp. An opening 54 having a rim 55 is formed at the bottom end of the globe 16. The rim 55 of the opening 54 is fitted in the cover portion 27 of the cover 13 and securely bonded therein by means of a viscous bonding agent, such as a silicon resin or an epoxy resin.

The lighting device 17 is provided with a substrate 58 on which a plurality of electronic components 60 forming a lighting circuit 59 are mounted. The substrate 58 has an approximately rectangular shape with such a width dimension that allows the substrate 58 to be inserted into the base 12 and a length greater than the width. With the two widthwise edges of the substrate 58 respectively fitted into the two substrate attaching grooves 49 of the holder 15, the substrate 58 is secured in the holder 15 so as to extend along the center axis of the holder 15, at a position off the center line of the holder 15. In other words, when the base 12, the cover 13, and the holder 15 are in the assembled state, the substrate 58 is in a vertical position extending along the center axis of the base 12, at a distance from the center axis of the base 12. By means of the substrate attaching portions 50, the horizontal position of the substrate 58 is removably secured. The height position of the substrate 58 is secured by means of connection of the wires 37 of the luminous tube 14 with wrapping pins 61, which will be described later, or insertion of the substrate 58 between the bottom of the base 12 and the base plate portion 42 of the holder 15.

The electronic components 60 are mounted on both sides of the substrate 58, which are referred to as a first face and a second face, respectively. The space inside the base 12 between the first face of the substrate 58 and the part of the inner wall of the base 12 that faces the first face is hereinafter referred to as the spacious area, and the space between the second face of the substrate 58 and the part of the inner wall of the base 12 that faces the second face is narrower than the spacious area and hereinafter referred to as the narrower area. Of these electronic components 60, large-size electronic components 60, such as a transformer CT, a capacitor C1, and an electrolytic capacitor C2, are mounted on the first face, which faces the spacious area. The transformer CT may be a ballast choke serving as a current limiting inductor. The electrolytic capacitor C2 serves as a smoothing capacitor and may otherwise be referred to as the electrolytic smoothing capacitor C2. Electronic components 60 of a surface mounting type, such as transistors low in height, chip-shaped capacitors, and a rectifying device, are mounted on the second face of the substrate 58, which faces the narrower area.

A field effect transistor Q1, which is an N-channel MOS transistor, and a field effect transistor Q2, which is a P-channel MOS transistor, are consolidated into a single package and surface-mounted on the second face of the substrate 58.

The electrolytic smoothing capacitor C2 is mounted on the first face of the substrate 58, in the middle of the width of the substrate 58, so as to protrude perpendicularly from the mounting surface of the substrate 58, resulting in an improved mounting efficiency of the substrate 58 and enabling the reduction of the dimensions of the substrate 58.

Examples of the electronic components 60 that are mounted near the base 12, in other words close to a widthwise edge of the substrate 58, include the capacitor C1, which is angled towards the middle of the width of the substrate 58. This configuration enables insertion of the substrate 58 into the base 12 without the capacitor C1 coming into contact with the inner wall of the base 12, ensuring efficient positioning of the lighting device 17 in the base 12. The angled electronic components 60, such as the capacitor C1, are discrete components. They are what are widely called radial components, which are mounted in an upright position on the substrate 58 by means of two lead wires.

Near the top end of the substrate 58, at which the luminous tube 14 is provided, four wrapping pins 61 are provided and protrude from the substrate 58. The wrapping pins 61 serve as connecting terminals around which the wires 37 of the electrodes 36 of the luminous tube 14 can be respectively wrapped and electrically connected thereto.

The thin tube 38 with the main amalgam 39 sealed therein is disposed in the narrow area, in other words the space between the inner wall of the base 12 and the second face of the substrate 58. This configuration enables efficient positioning of the lighting device 17 and the thin tube 38 in the base 12.

It is desirable that the offset distance of the substrate 58 from the center axis of the base 12 be limited so that the distance of the substrate 58 from the inner wall of the base 12 does not exceed three quarters of the inner diameter of the base 12. It is not desirable to position the substrate 58 closer to the inner wall of the base 12 in such a way that the distance of the substrate 58 from the inner wall of the base 12 exceeds three quarters of the inner diameter of the base 12, because positioning the substrate 58 outside the abovementioned range makes the width of the substrate 58 exceedingly narrower, resulting in a smaller mounting area and a reduced mounting efficiency of the electronic components 60 on the substrate 58.

To be more specific, as shown in FIG. 6, it is desirable that the offset distance of the substrate 58 from the center axis of the base 12 be such that the relationship of A and B is limited in the range of $0.5 < A/B \leq 0.8$, wherein A represents the distance between the inner wall of the base 12 and the first face of the substrate 58, which faces the spacious area in the base 12, and B represents the inner diameter of the base 12. A ratio A/B that is not greater than 0.5 would make it difficult to place a large-size electronic component 60 in the base 12. A ratio A/B greater than 0.8 is also undesirable, because it would require a substantially narrower substrate 58, resulting in a smaller mounting area and a reduced mounting efficiency of the electronic components 60 on the substrate 58. In cases where an E26-type base 12 is used, a ratio A/B in the range of 0.6 to 0.75 is more desirable, taking into consideration such factors as the height of the electronic components 60.

A thermal conductive material 65 (e.g. a thermal conductive silicon resin), is injected into the base 12.

A filling area may be filled with the thermal conductive material 65 so as to bring the thermal conductive material 65 in contact with the electrolytic smoothing capacitor C2, the transformer CT, and the inner surface of the shell 21 of the base 12. This enables effective heat transmission and dissipation, thereby reducing temperature of electronic components 60, such as the electrolytic smoothing capacitor C2 and the transformer. Furthermore, this effect can be achieved also with a configuration where the thin tube 38 is not located inside the base 12.

Another filling area may be filled with the thermal conductive material 65 so as to bring the thermal conductive material 65 in contact with the thin tube 38 and the inner surface of the shell 21 of the base 12. This enables effective heat transmission and dissipation, thereby reducing temperature of the main amalgam 39.

The thermal conductive material 65 may be provided in either one of or both the abovementioned filling areas, or the entire interior of the base 12 may be filled with the thermal conductive material 65.

FIG. 7 shows a circuit diagram of the lighting device, wherein a capacitor C1, which constitutes a filter, is connected to a commercial AC power supply e via a fuse F1. An input terminal of a full-wave rectifying circuit 71 is connected to the capacitor C1 through an inductor L1, which constitutes a filter. The aforementioned electrolytic smoothing capacitor C2 is connected to an output terminal of the full-wave rectifying circuit 71. Thus, an input power circuit E is formed. An inverter main circuit 73 of a half-bridge type inverter circuit 72, which serves as an AC power supply that generates high frequencies, is connected to the electrolytic smoothing capacitor C2 of the input power circuit E.

The inverter main circuit 73 includes serially connected field effect transistors Q1,Q2, which complement each other and serve as a switching element, and are connected in parallel with the electrolytic smoothing capacitor C2. The field effect transistor Q1 is an N-channel MOS transistor, while the field effect transistor Q2 is a P-channel MOS transistor. A source of the N-channel field effect transistor Q1 and a source of the P-channel field effect transistor Q2 are connected to each other.

A series circuit comprised of a primary winding L2 of the non-saturated current transformer CT, a DC interrupting capacitor C3, and a resonance capacitor C4 is connected between the drain and the source of the field effect transistor Q2. The non-saturated current transformer CT constitutes a ballast choke that serves as a resonance inductor. A fluorescent lamp FL serves as the luminous tube 14 and has electrode filament coils FLa,FLb, which are respectively disposed at the two ends of the fluorescent lamp FL and serve as filaments. An end of each electrode filament coil FLa,FLb is connected to the resonance capacitor C4. A preheating/start-up capacitor C5, which contributes to resonance together with the resonance capacitor C4, is connected between the other end of the electrode filament coil FLa and the other end of the electrode filament coil FLb. Furthermore, emitter is applied to the electrode filament coils FLa,FLb. A positive temperature coefficient thermistor PTC1 is connected in parallel with the resonance capacitor C4.

A starting resistor R1, which forms a part of an activating circuit 75, is connected between the electrolytic smoothing capacitor C2 and a connection point between the gate of the field effect transistor Q1 and the gate of the field effect transistor Q2. A series circuit comprised of a capacitor C6 and a capacitor C7 is connected between the gates of the field effect transistors Q1,Q2 and the sources of the field effect transistors Q1,Q2. A series circuit comprised of Zener diodes ZD1, ZD2, which serve to protect the field effect transistors Q1,Q2, is connected in parallel with the series circuit of the capacitor C6 and the capacitor C7. The capacitor C7 forms a part of a gate control circuit 76 serving as a gate control means. A secondary winding L3 is magnetically connected to the primary winding L2 of the transformer CT. An end of the secondary winding L3 is connected to the connecting point between an end of an inductor L4 and a discharge resistor R2. The other end of the inductor L4 is connected to the connecting point between the capacitor C6 and the capacitor C7. The capacitor C6 constitutes a trigger element of the activating circuit 75, and the aforementioned discharge resistor R2 of the activating circuit 75 is connected in parallel with a series circuit comprised of the capacitor C6 and the inductor L4.

A parallel circuit comprised of a resistor R3 of the activating circuit 75 and a capacitor C8 is connected between the drain and the source of the field effect transistor Q2. The capacitor C8 serves to improve a switching function.

A negative temperature coefficient thermistor NTC1 is connected between the two ends of the electrode filament coil FLa of the fluorescent lamp FL, and a negative temperature coefficient thermistor NTC2 is connected between the two ends of the electrode filament coil FLb.

The positive temperature coefficient thermistor PTC1, the negative temperature coefficient thermistors NTC1/NTC2, etc. may be wrapped around the wrapping pins 61 of the substrate 58 so that they are electrically connected to the wrapping pins 61 and disposed at more proximity to the luminous tube 14.

Next, how the lighting device 17 functions is explained hereunder.

When the power is turned on, the voltage on the commercial AC power supply e is rectified over a full wave by the full-wave rectifying circuit 71 and smoothed by the electrolytic smoothing capacitor C2.

Through the resistor R1, a voltage is applied to the gate of the N-channel field effect transistor Q1, thereby turning on the field effect transistor Q1. As a result, a voltage is applied to the closed circuit comprised of the primary winding L2 of the transformer CT, the capacitor C3, the resonance capacitor C4, and the capacitor C5 so that the primary winding L2 of the transformer CT, the capacitor C3, the resonance capacitor C4, and the capacitor C5 resonate. At that time, an impedance component of the positive temperature coefficient thermistor PTC1, too, is included in the components for resonance synthesis. An inductance component of the primary winding L2 of the transformer CT is negligible as a component for resonance synthesis component. A voltage is then induced on the secondary winding L3 of the transformer CT, and an LC series circuit comprised of the capacitor C7 of the gate control circuit 76 and the inductor L4 generates intrinsic resonance, thereby generating at a nearly constant frequency such a voltage as to turn on the field effect transistor Q1 and turn off the field effect transistor Q2.

When the resonance voltage on the primary winding L2 of the transformer CT, the capacitor C3, the resonance capacitor C4, and the capacitor C5 is inverted thereafter, a voltage that is the reverse of the aforementioned voltage is generated on the secondary winding L3 so that the gate control circuit 76 generates such a voltage as to turn off the field effect transistor Q1 and turn on the field effect transistor Q2. When the resonance voltage on the primary winding L2 of the transformer CT, the capacitor C3, the resonance capacitor C4, and the capacitor C5 is inverted further, the field effect transistor Q1 is turned on, while the field effect transistor Q2 is turned off. Thereafter, the field effect transistor Q1 and the field effect transistor Q2 are alternately turned on and off in the same manner as above to generate resonance voltage so that a resonance current flows.

When the resonance current starts to flow, a large amount of current flows through the positive temperature coefficient thermistor PTC1, because the resistance of the positive temperature coefficient thermistor PTC1 is low, e.g. in the range of from approximately 3 kΩ to 5 kΩ, due to a low temperature. During this period, the resonance voltage generated between the two ends of the resonance capacitor C4 is low.

The current flowing through the positive temperature coefficient thermistor PTC1 generates Joule heat and thereby increases the resistance of the positive temperature coefficient thermistor PTC1, resulting in reduction in the amount of current flowing through the positive temperature coefficient thermistor PTC1. As a result, a change occurs in the components for resonance synthetic so that resonance function, too, changes so as to increase the amount of current flowing to the resonance capacitor C4. Thus, "soft startup" is performed in which the resonance voltage gradually increases.

As a part of the resonance current is fed through the electrode filament coils FLa,FLb of the fluorescent lamp FL to the capacitor C5, which is a part of a resonance capacitor, the electrode filament coils FLa,FLb are directly preheated over a sufficient time until the resonance voltage increases. As the capacitor C5 for resonance is provided separately from the resonance capacitor C4, the capacity for resonance is divided. As a result, the capacity of the capacitor C5 can be so set as to ensure flow of an appropriate amount of current at the time of preheating the electrode filament coils FLa,FLb, as well as lighting the fluorescent lamp FL. Therefore, the configuration enables efficient preheating of the electrode filament coils FLa,FLb. The configuration described above also enables reduction of the current flowing to the capacitor C5 after the fluorescent lamp FL has become lit, and thereby prevents a decrease in efficiency after the fluorescent lamp FL has become lit.

The change in the resonance components resulting from the increase of the resistance of the positive temperature coefficient thermistor PTC1 increases the resonance current, thereby increasing the voltage to a level required by start-up of the lamp. As a result, the fluorescent lamp FL starts discharge, and, consequently, starts up and becomes illuminated.

After the fluorescent lamp FL has becomes illuminated, the resistance of the positive temperature coefficient thermistor PTC1 reaches several tens of ks of Ω, which is substantially greater than the equivalent resistance of the fluorescent lamp FL. Therefore, the resonance voltage decreases, and the fluorescent lamp FL remains illuminated. By thus connecting the positive temperature coefficient thermistor PTC1 in parallel with the resonance capacitor C4 instead of with the capacitor C5, the configuration described above enables reduction of the current flowing to the electrode filament coils FLa,FLb and thereby reduces power loss by the amount equivalent to the reduction of the amount of the current.

As described above, change in resistance of the positive temperature coefficient thermistor PTC1 enables appropriate preheating of the electrode filament coils FLa,FLb of the fluorescent lamp FL and thereby prevents undesirable spattering of the emitter. Therefore, the configuration of the present embodiment increases the blinking life of the fluorescent lamp FL.

Before a start-up of the fluorescent lamp FL, the resistance of each negative temperature coefficient thermistor NTC1, NTC2 is high due to their low temperature. Therefore, a part of the resonance current flows to the electrode filament coils FLa,FLb of the fluorescent lamp FL and appropriately preheats the electrode filament coils FLa,FLb, while a small amount of resonance current flows also to the negative temperature coefficient thermistors NTC1,NTC2. With an increase of the resonance current, the resonance current flowing to the negative temperature coefficient thermistors NTC1, NTC2 causes the negative temperature coefficient thermistors NTC1,NTC2 to generate heat due to Joule heat. As the negative temperature coefficient thermistors NTC1, NTC2 are also affected by the heat from the fluorescent lamp FL, the temperature of each negative temperature coefficient thermistor NTC1,NTC2 increases, resulting in a decrease in their resistance. As a result, the current that has been flowing to the electrode filament coils FLa,FLb gradually begins to flow to the negative temperature coefficient thermistors NTC1,NTC2.

When the temperature of the negative temperature coefficient thermistors NTC1,NTC2 increases after the fluorescent lamp FL has been lit, and their resistance decreases to an absolute minimum, nearly all the resonance current flows into the negative temperature coefficient thermistors NTC1, NTC2, and almost no resonance current flows into the electrode filament coils FLa,FLb. As a result, power loss due to the electrode filament coils FLa,FLb is reduced to an absolute minimum.

From the bottom end of the substrate 58 to the top end, at which the luminous tube 14 is provided, the input power circuit E connected to the base 12, the inverter circuit 72 connected to the input power circuit E, and the output unit of the inverter circuit 72 connected to the luminous tube 14 are sequentially formed on the substrate 58. In other words, a circuit pattern in which components are arranged in an appropriate order in one direction from the input side to the output side is formed on the substrate 58 so that the substrate 58 can be made more compact.

Next, how to assemble the self-ballasted fluorescent lamp 11 is explained. First, the bottom end portion of the luminous tube 14 and the holder 15 are assembled, and a bonding agent is injected from the inside of the holder 15 through the fitting holes 46 and the insertion holes 47 to fix the bottom end portion of the luminous tube 14 and the holder 15 to each other. Then, the substrate 58 is inserted into the holder 15 so that the two widthwise edges of the substrate 58 respectively slide into the two substrate attaching grooves 49 of the holder 15, and the wires 37 of the luminous tube 14, which are drawn into the holder 15, are wrapped around and thereby electrically connected to the respective wrapping pins 61 of the substrate 58 (the wrapped wires 37 not shown in the drawings). Next, the holder 15 and the cover 13 are assembled and joined together. Thereafter, wires (not shown in the drawings) that are already connected to the input end of the substrate 58 are connected to the shell 21 and the eyelet 23 of the base 12, and the base 12 is fitted to the cover 13 and fastened thereto by crimping or bonding. Then, the self-ballasted fluorescent lamp 11 is positioned so that the luminous tube 14 is located above the base 12, the thermal conductive material is injected through the cutout portions 51 of the holder 15 until the thermal conductive material fills the entire interior of the base 12, or at least the space between the base 12 (or the cover 13) and the electronic components 60, for example the transformer CT, that are disposed facing the cutout portions 51 of the holder 15. Thereafter, the globe 16 is placed over the luminous tube 14 and fastened to the cover 13 by a boding agent.

As shown in FIG. 8, a lighting apparatus 81, which may be a downlight, has a lighting apparatus body 82, in which a socket 83 and a reflector 84 are fitted. A self-ballasted fluorescent lamp 11 is fitted to the socket 83.

The self-ballasted fluorescent lamp 11 having a structure described above includes a substrate 58 that has such a width dimension that allows the substrate 58 to be inserted into the base 12 and disposed vertically along the center axis of the base 12, at a position off the center axis of the base 12 so that the large components among the electronic components 60 can be disposed on the first face, which faces the spacious area in the base 12. This configuration ensures efficient positioning of the lighting device 17 in the base 12, and enables the cover 13 to be made compact.

The location of the substrate 58, which is disposed off the center axis of the base 12, is limited within the range of $0.5 < A/B \leq 0.8$, wherein A represents the distance between the inner wall of the base 12 and the first face of the substrate 58, which faces the spacious area in the base 12, and B represents the inner diameter of the base 12. The configuration described above ensures a sufficient mounting area for the electronic components 60 by ensuring a sufficient width of the substrate 58 while enabling mounting of large-size electronic components 60.

By positioning an electronic component 60 that is mounted near the base 12, in other words close to a widthwise edge of the substrate 58, at an angle towards the middle of the width of the substrate 58, the substrate 58 can be inserted into the base 12 without the electronic component 60 coming into contact with the inner wall of the base 12. Therefore, efficient positioning of the lighting device 17 in the base 12 can be achieved.

According to the configuration of the embodiment described above, the electrolytic smoothing capacitor C2, which is relatively tall in height among the electronic components 60 mounted on the substrate 58, can be mounted on the first face of the substrate 58, in the middle of the width of the substrate 58, so as to protrude perpendicularly from the mounting surface of the substrate 58. Therefore, present embodiment improves the mounting efficiency of the substrate 58 and enables the substrate 58 to be made more compact.

From the bottom end of the substrate 58 to the opposite end, at which the luminous tube 14 is provided, the input power circuit E, the inverter circuit 72, and the output unit of the inverter circuit 72 are sequentially formed on the substrate 58. In other words, a circuit pattern in which components are arranged in an appropriate order in one direction from the input side to the output side is formed on the substrate 58 so that the substrate 58 can be made more compact.

Furthermore, as the substrate 58, which has such a width dimension that allows the substrate 58 to be inserted into the base 12, is disposed vertically along the center axis of the base 12, the tip of the thin tube 38 of the luminous tube 14, in which the main amalgam 39 is sealed, can be disposed in the space between the inner wall of the base 12 and the substrate 58. With the configuration as above, the present embodiment is capable of efficiently disposing the lighting device 17 and the thin tube 38 in the base 12, thereby enabling the cover 13 to be made compact, while reducing the thermal influence that the luminous tube 14 exerts on the main amalgam 39 during the time the luminous tube is lit.

The substrate 58 is positioned off the center axis of the base 12, and the thin tube 38 is disposed in the narrower area between the inner wall of the base 12 and the second face of the substrate 58. With the configuration as above, the present embodiment enables large-size electronic components 60 to be mounted on the first face, which faces the spacious area in the base 12, thereby enabling efficient positioning of the lighting device 17 and the thin tube 38 in the base 12.

Furthermore, as the substrate 58 is disposed between the large-size electronic components 60 and the thin tube 38, the large-size electronic components 60 and the thin tube 38 are thermally shielded from each other and less prone to being affected by heat from each other.

As shown in FIG. 1, the self-ballasted fluorescent lamp 11 having the configuration described as above can be formed such that the maximum width b1 of the luminous tube 14 having the bulbs 31,32,33, each of which has an outer tube diameter ranging from 3 to 8 mm, is up to 30 mm, preferably in the range of 20 to 30 mm; the proportion of the distance h2 by which the cover 13 is exposed from the base 12 to the lamp length h1, which is the length of the lamp excluding the base 12, ranges from 0 to 25%; the maximum outer diameter b2 of the cover 13 ranges from 1.0 to 1.5 times the outer diameter b3 of the base 12 or from 0.48 to 0.73 times the maximum outer diameter b4 of the globe 16; and that the outer diameter of the bottom end of the globe 16 is up to 40 mm. As a result, an appearance similar to that of an electric light bulb for general illumination, such as an incandescent lamp, can be achieved. When the proportion of the distance h2 by which the cover 13 is exposed from the base 12 to the lamp length h1, which is the length of the lamp excluding the base 12, is 0%, it means that no part of the cover 13 is exposed from the base 12 when the self-ballasted fluorescent lamp 11 is viewed in the widthwise direction. If such is the case, the rim 55 of the opening 54 of the globe 16 is fitted in the shell 21 of the base 12.

As described above, the holder 15 of the self-ballasted fluorescent lamp 11 is disposed at the center of the luminous tube 14 and has concave portions 45, which face the bulbs 31,32,33, and the inward-facing side of each bottom end portion of the bulbs 31,32,33 is bonded to the corresponding concave portion 45 by means of a bonding agent. Therefore, the self-ballasted fluorescent lamp 11 is capable of using the light that is emitted from the outward-facing side of the bottom end portions of the bulbs 31,32,33 without being blocked by the holder 15, resulting in an improved luminance efficiency.

As described above, the self-ballasted fluorescent lamp 11 is able to have an appearance similar to that of an electric light bulb for general illumination, such as an incandescent lamp, as well as light distribution with characteristics similar to those of an incandescent lamp due to an improved light distribution to the side where the base 12 is provided. Therefore, the self-ballasted fluorescent lamp 11 is more readily applicable to a lighting fixture that uses an electric light bulb for general illumination, such as an incandescent lamp.

Furthermore, as the thermal conductive material 65 is provided inside the base 12 and thermally connects the base 12 with at least the electronic components 60 that generate a relatively large amount of heat, such as the transformer CT, the heat generated by the electronic components 60 can be effectively dissipated.

Figure 9:
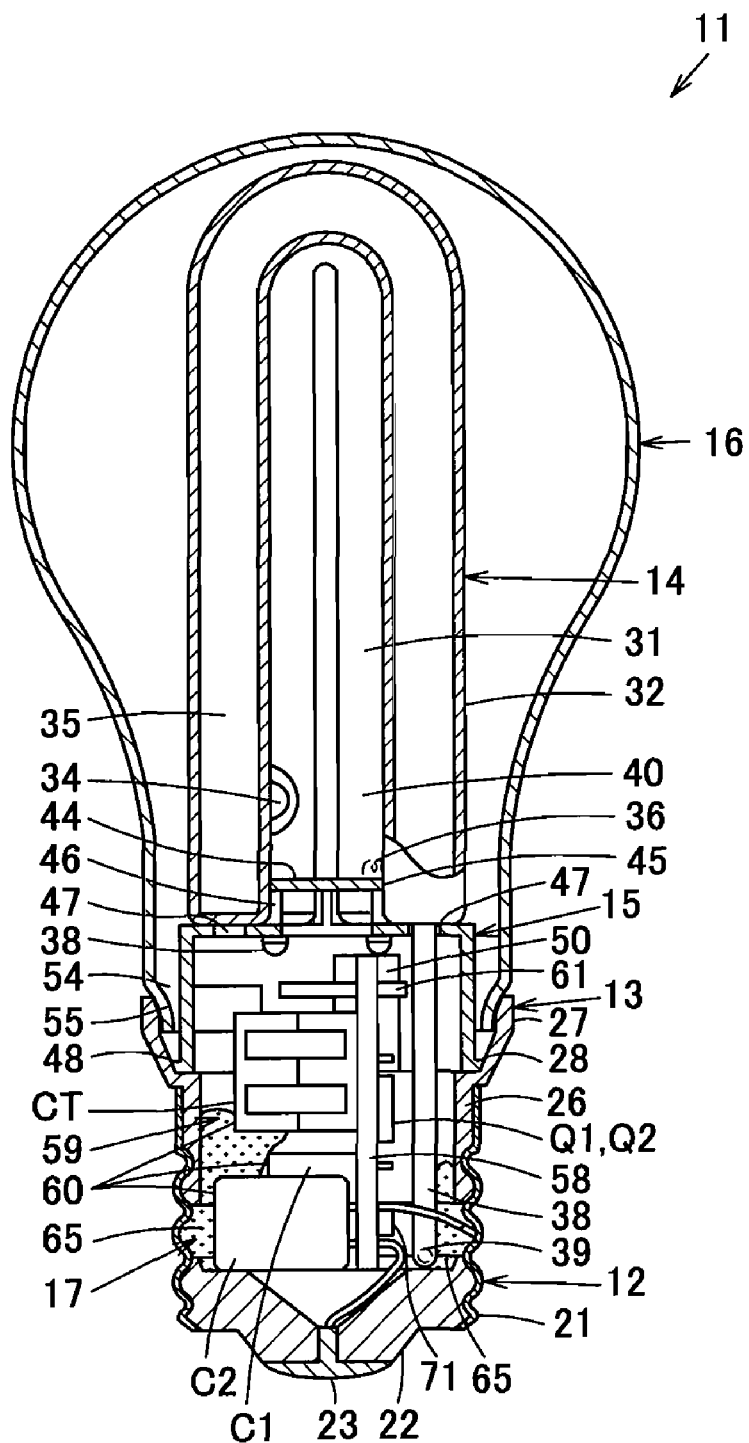
FIG. 9 is a sectional view of a self-ballasted fluorescent lamp according to a second embodiment of the present invention as viewed in the direction in which bulbs of the lamp are aligned.

A second embodiment of the invention is shown in FIG. 9, which provides a sectional view of a self-ballasted fluorescent lamp as viewed in the direction in which bulbs of the lamp are aligned.

A pair of lead wires of an electronic component 60, for example, the capacitor C1, at the input side of the AC power supply of the lighting circuit 59 is connected to the shell 21 and the eyelet 23 of the base 12. This configuration eliminates the necessity of electrical wires for connecting the substrate 58 to the base 12, as well as the necessity for providing the substrate 58 with a connector portion for connecting the electrical wires to the substrate 58, enabling the substrate 58 to be made compact.

The two lead wires of the capacitor C1 are connected to the base 12 as described above when the fuse F1 is not used. In cases where the fuse F1 is used, a single wire is necessary to connect the fuse F1 to the base 12, because one of the lead wires of the capacitor C1 is connected to the fuse F1. However, the other lead wire of the capacitor C1 can be connected to the base 12 and thus enables the reduction of one wire.

Figure 10:
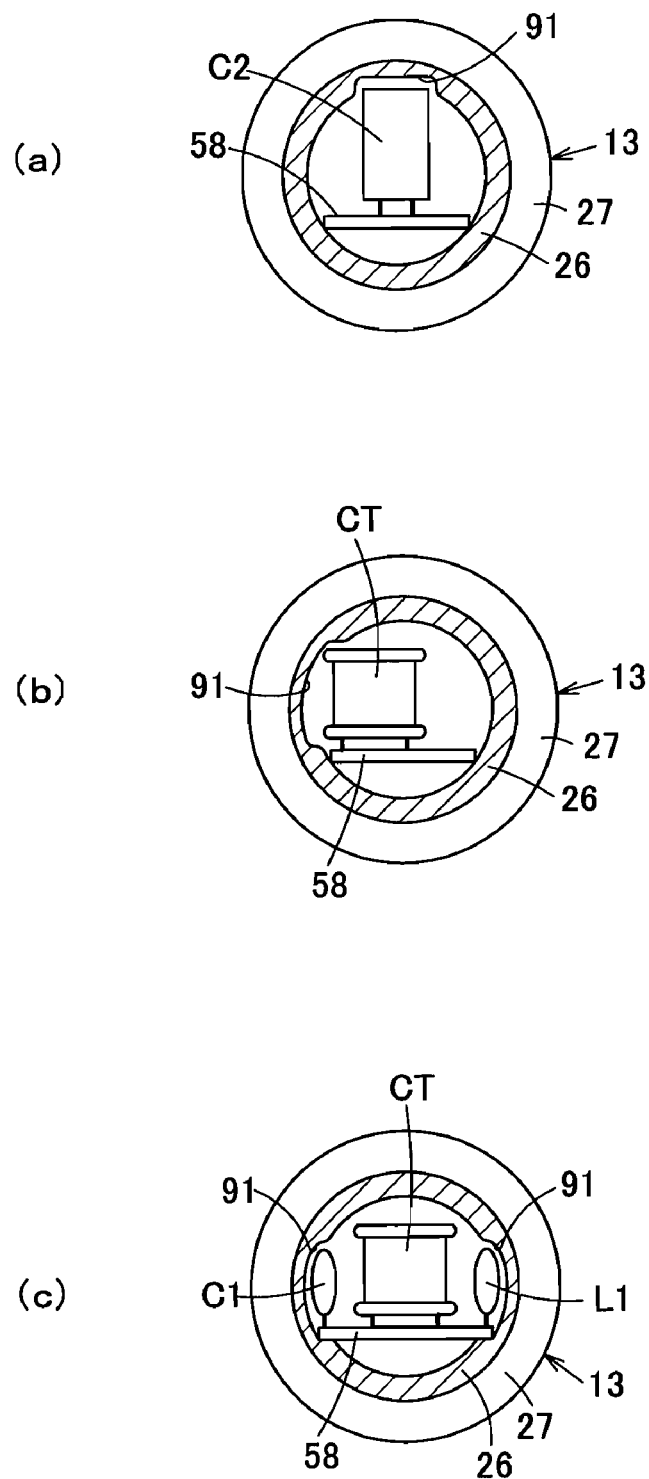
FIG. 10 is a sectional view of a self-ballasted fluorescent lamp according to a third embodiment of the present invention, wherein (a) through (c) respectively show examples of positional relationship of the cover and the lighting device of the self-ballasted fluorescent lamp.

FIG. 10 is a sectional view of a self-ballasted fluorescent lamp according to a third embodiment of the present invention, wherein (a) through (c) respectively show examples of positional relationship of the cover and the lighting device of the self-ballasted fluorescent lamp.

At least one indented portion 91 for preventing interference with the electronic components 60 is formed in the inner surface of the cover 13. FIG. 10(a) shows an example in which an indented portion 91 is formed in order to accommodate the distal end of the electrolytic capacitor C2. FIG. 10(b) shows an example in which the transformer CT is disposed to one side of the substrate 58, and an indented portion 91 is formed in order to accommodate flange portions at both sides of a coil bobbin around which a coil of the transformer CT is wound. FIG. 10(c) shows an example in which the transformer CT is disposed at the center of the substrate 58; the transformer CT is flanked by components with a curved shape, e.g. a capacitor C1 and an inductor L1; and indented portions 91 are formed in order to accommodate the capacitor C1 and the inductor L1 respectively.

As described above, the indented portion 91 formed in the inner surface of the cover 13 prevents interference with the electronic components 60 disposed on the substrate 58 and enables the substrate 58, which is disposed off the center axis of the base 12, to be positioned closer to the center axis of the base 12. As a result, the substrate 58 may have a wider width to have a larger mounting area for the electronic components 60, or a plurality of electronic components 60 can be disposed along the width of the substrate 58, thereby increasing the mounting efficiency. When the self-ballasted fluorescent lamp 11 is assembled, the presence of at least one indented portion 91 facilitates assembly, because it makes it less likely for the cover 13 and the electronic components 60 to come into contact with each other.

The indented portion 91 may serve to accommodate an electronic component 60 when the self-ballasted fluorescent lamp 11 is in the assembled state, or permit the corresponding electronic component 60 to pass through at the time of assembly but does not accommodate it when the self-ballasted fluorescent lamp 11 is in the assembled state.

Some electronic components 60, such as the electrolytic capacitor C2 and the transformer CT, have corners. Rounding the corners of these electronic components 60 achieves the same functions and effects as can be achieved by providing indented portions 91. Particularly superior effects can be achieved by rounding the corners of the electronic components 60 in addition to providing an indented portion 91.

Figure 11:
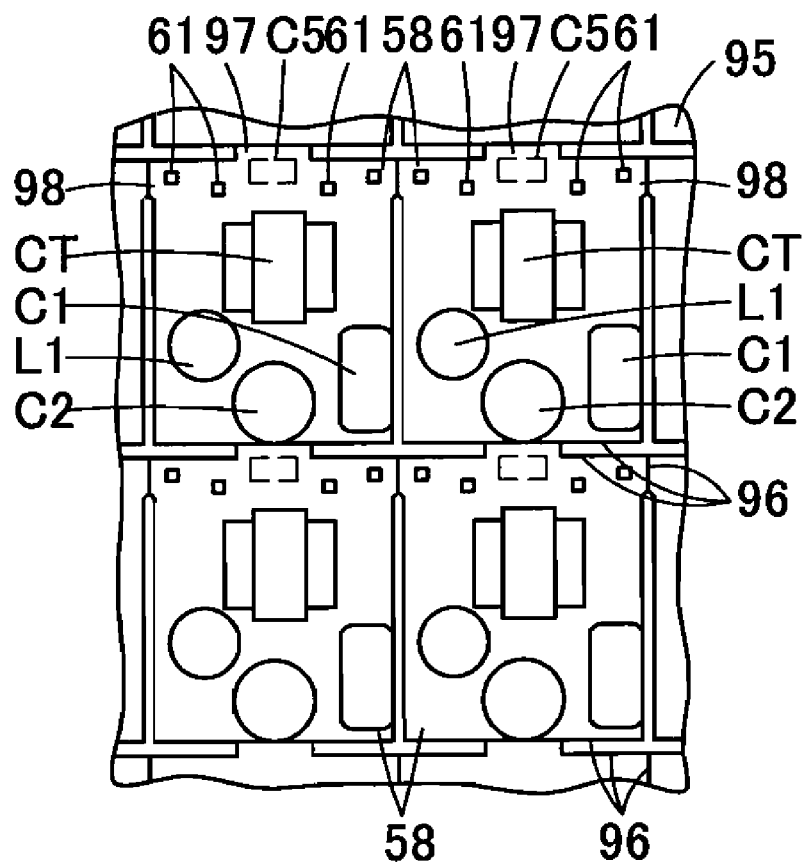
FIG. 11 shows a fourth embodiment of the present invention in a front view of a part of an aggregate substrate from which substrates of the self-ballasted fluorescent lamp are cut out.

The fourth embodiment of the invention is shown in FIG. 11, which is a front view of a part of an aggregate substrate from which substrates of the self-ballasted fluorescent lamp are cut out.

According to the present embodiment, a plurality of substrates 58 are formed from a single, large aggregate substrate 95. A plurality of substrates 58, each of which has a circuit pattern formed thereon, are arranged along the length and width of the aggregate substrate 95; electronic components 60 are sequentially disposed on each substrate 58 by means of an automatic electronic component loading apparatus; and the electronic components 60 are soldered and thereby electrically connected to the circuit pattern of each substrate 58 by means of a soldering apparatus. Slit portions 96 are formed between the substrates 58 so that the substrates 58 can be separated by cutting the aggregate substrate 95 along the slit portions 96.

The capacitor C5, which is a chip capacitor, is surface-mounted on each substrate 58, at the middle of the substrate 58, near the top end of the substrate 58, at which the luminous tube 14 is located.

To be more specific, at a location near the middle of the edge facing the luminous tube 14, the capacitor C5, which is a ceramic chip capacitor, is surface-mounted between the two sets of wrapping pins 61,61 on the second face of the substrate 58, which faces the narrower area in the base 12. A protruding portion 97 protruding away from the capacitor C5 is formed at the top end of the substrate 58. Because of the presence of the protruding portion 97, the capacitor C5, which is disposed close to the end of the substrate 58, and the soldered portion at which the capacitor C5 is connected to the substrate 58 are protected from a mechanical load, when the substrate 58 is cut out from the single aggregate substrate 95. Furthermore, forming protruding portions 97 only at portions that require a protruding portion 97 enables the substrates 58 to be made compact.

The capacitor C5 is a preheating/start-up capacitor connected in parallel with the electrodes at the two ends of the luminous tube 14. The capacitor C5 is a ceramic chip capacitor and can be surface mounted. Using such a capacitor as the capacitor C5 enables effective use of the space between the two sets of wrapping pins 61,61, resulting in an improved mounting efficiency of electronic components. Mounting the capacitor C5 between connecting terminals can be applied also to a lighting apparatus with a circuit substrate disposed horizontally with respect to the base 12. In cases where a circuit substrate is disposed in a vertical position as is true in the present embodiment, the wrapping pins 61 are located near the luminous tube 14 and therefore prone to becoming hot. The present embodiment is particularly beneficial in such a configuration, because the embodiment enables the use of a ceramic chip capacitor, which has superior heat resistance.

A protruding portion 98 to be fitted in each respective substrate attaching groove 49 of the holder 15 is formed at each widthwise edge of the substrate 58, at a location closer to the top end, at which the luminous tube 14 is located. These protruding portions 98,98 not only facilitate engagement of the substrate 58 with the substrate attaching grooves 49 of the holder 15 but also are able to function as slide portions that are capable of sliding in the substrate attaching grooves 49 of the holder 15. Furthermore, forming protruding portions 98,98 only at portions where they are required for fitting in the substrate attaching grooves 49 of the holder 15 eliminates the necessity for providing a separate supporting mechanism and thereby enables the substrate 58 to be made more compact by the dimensions equivalent to those of the supporting mechanism.

The protruding portion 97, which is formed so as to protrude in the direction in which the surface of the substrate 58 extends, away from the chip-shaped electronic component 60 disposed near an end of the substrate 58, may be formed at the bottom end of the substrate 58. Or, a protruding portion 97 may be formed at each widthwise edge so as to also serve as a protruding portion 98, which functions as a slide portion.

In each of the embodiments described above, the meaning of "the space inside the base 12" is not limited to the inside of the shell 21 of the base 12. In cases where the cylindrical base fitting portion 26 extends further towards the eyelet 23, the space inside the base fitting portion 26 serves as the space inside the base 12, and the offset distance of the substrate 58 is determined by the inner diameter of the base fitting portion 26.

The number of the bulbs 31,32,33 of the luminous tube 14 is not limited to three; the luminous tube 14 may comprise two bulbs, or four or more bulbs arranged one in front of the other to form a longer discharge path. In an alternative structure, the luminous tube 14 may be bent into the shape of a spiral so that the two electrode-side end portions 40, in which the two electrodes 36 are respectively sealed, are located at one end in the height direction of the luminous tube 14, i.e. the bottom end of the luminous tube 14.

In any one of the embodiments described above, the globe 16 may be omitted so that the luminous tube 14 is exposed. Such a configuration, too, achieves an appearance and dimensions, as well as light distribution characteristics, similar to those of an electric light bulb for general illumination, such as an incandescent lamp, and is even more easily applicable to a lighting fixture that uses an electric light bulb for general illumination, such as an incandescent lamp.

The invention claimed is:

1. A self-ballasted fluorescent lamp having a bottom end and a top end that are respectively located at two lengthwise ends of the self-ballasted fluorescent lamp, the self-ballasted fluorescent lamp comprising:
   a luminous tube;
   a cover having a bottom end, to which a base is attached, and a top end, at which the luminous tube is supported; and
   a lighting device provided with a substrate having a first face and a second face on both of which electronic components constituting a lighting circuit for lighting the luminous tube are mounted; wherein:
   the substrate has such a width dimension that enables insertion of the substrate into the base and is positioned vertically along a center axis of the base, offset from a center axis of the base;
   a first area is provided between the first face of the substrate and a part of a part of an inner wall of the base that faces the first face;
   a second area that is narrower than the first area is provided between the second face of the substrate and the inner wall of the base that faces the second face; and
   large-size electronic components among the electronic components are mounted on the first face, which faces the first area.

2. The self-ballasted fluorescent lamp as claimed in claim 1, wherein:
   the luminous tube is provided with a thin tube projecting from a bottom end of the luminous tube;
   an amalgam is sealed in a tip of the thin tube; and
   the tip of the thin tube is positioned in the narrower area, which is located between the second face of the substrate and the inner wall of the base.

3. The self-ballasted fluorescent lamp as claimed in claim 1, wherein:
   the substrate, which is offset from the center axis of the base, is disposed at such a location that a relationship of A and B is limited in a range of $0.5 < A/B \leqq 0.8$, with A representing the distance between the inner wall of the base and the first face of the substrate, which faces the first area, and B representing an inner diameter of the base.

4. The self-ballasted fluorescent lamp as claimed in claim 1, wherein:
   a smoothing capacitor among the electronic components mounted on the substrate is mounted on the first face of the substrate, at a location in a middle of the width of the substrate, so as to protrude perpendicularly from the first face of the substrate.

5. The self-ballasted fluorescent lamp as claimed in claim 1, wherein:
   the electronic component that is mounted close to a widthwise edge of the substrate is positioned at an angle towards the middle of the width of the substrate.

6. The self-ballasted fluorescent lamp as claimed in claim 1, wherein:
   an input power circuit, an inverter circuit, and an output unit of the inverter circuit are formed on the substrate in a sequential arrangement from a bottom end of the substrate to a top end; and
   the input power circuit is connected to the base; the inverter circuit is connected to the input power circuit; and the output unit of the inverter circuit is connected to the luminous tube.

7. The self-ballasted fluorescent lamp as claimed in claim 1, wherein:
   an indented portion for preventing interference with the electronic component is formed in an inner surface of the cover.

8. The self-ballasted fluorescent lamp as claimed in claim 1, wherein:
   the substrate is provided with a pair of protruding portions in such a manner that each protruding portion protrudes from each respective widthwise edge of the substrate in a direction in which a mounting surface of the substrate extends, away from the electronic component disposed near the widthwise edge of the substrate.

9. The self-ballasted fluorescent lamp as claimed in claim 1, wherein:
   a thermal conductive material that serves to thermally connect the base with at least one or more electronic components among the electronic components is disposed in the base.

10. A lighting apparatus comprising:
    a lighting apparatus body;
    a socket attached to the lighting apparatus body; and
    a self-ballasted fluorescent lamp as claimed in claim 1, the self-ballasted fluorescent lamp being attached to the socket.

* * * * *